United States Patent

Kawabata

[11] Patent Number: 5,940,158
[45] Date of Patent: Aug. 17, 1999

[54] PEN-GRIP TYPE OF INPUT APPARATUS AND INPUT APPARATUS

[75] Inventor: Kazuki Kawabata, Osaka, Japan

[73] Assignee: Japan Nesamac Corporation, Osaka, Japan

[21] Appl. No.: 08/727,524

[22] PCT Filed: Apr. 11, 1994

[86] PCT No.: PCT/JP94/00609

§ 371 Date: Dec. 16, 1996

§ 102(e) Date: Dec. 16, 1996

[87] PCT Pub. No.: WO95/27936

PCT Pub. Date: Oct. 19, 1995

[51] Int. Cl.$^6$ .................................................. G09G 5/08
[52] U.S. Cl. ............................ 349/179; 345/157; 463/37
[58] Field of Search ........................... 345/156, 157, 345/158–159, 160, 168, 169, 174, 179; 341/22.34; 400/473, 485, 486, 488; 178/18.19, 18.01, 19.01, 19.05, 20.01; 463/37

[56] References Cited

U.S. PATENT DOCUMENTS

| | | | |
|---|---|---|---|
| 4,040,010 | 8/1977 | Crane et al. | 340/146.3 |
| 4,131,880 | 12/1978 | Siy et al. | 340/146.3 |
| 4,313,113 | 1/1982 | Thornburg | 340/709 |
| 4,707,571 | 11/1987 | Clements et al. | 178/18 |
| 4,896,543 | 1/1990 | Gullman | 73/862.04 |
| 5,004,871 | 4/1991 | Purcell | 178/18 |
| 5,095,510 | 3/1992 | Webster | 382/3 |
| 5,358,343 | 10/1994 | Klauber | 400/485 |

FOREIGN PATENT DOCUMENTS

| | | |
|---|---|---|
| 57-45681 | 3/1982 | Japan . |
| 60-17528 | 1/1985 | Japan . |
| 61-51227 | 3/1986 | Japan . |
| 61-135240 | 8/1986 | Japan . |
| 62-83682 | 5/1987 | Japan . |
| 63-124122 | 5/1988 | Japan . |
| 1-248224 | 10/1989 | Japan . |
| 2-287775 | 11/1990 | Japan . |
| 3-257613 | 11/1991 | Japan . |
| 3-263116 | 11/1991 | Japan . |
| 4-032919 | 2/1992 | Japan . |
| 4-195321 | 7/1992 | Japan . |

*Primary Examiner*—Lun-Yi Lao
*Attorney, Agent, or Firm*—Merchant, Gould, Smith, Edell, Welter & Schmidt

[57] ABSTRACT

This invention provides a pointing device which gives a feeling of operation closer to the feel of people without requiring an operation space. While a writing instrument having a pen grip (2) fitted thereto is held by a hand, a gripping force is applied by fingers as if a line were drawn in a moving direction of a cursor (the line need not be drawn in practice). The pressures of the fingers are measured by strain gauges (28a, 28b, and 28c), which send their corresponding voltage values to a CPU (40). The CPU (40) calculates the moving direction and distance of the cursor on the basis of the voltage values. Then, receiving the data, the cursor is moved to a designated position. When a microswitch (110) is pushed, the cursor position is made definite.

10 Claims, 11 Drawing Sheets

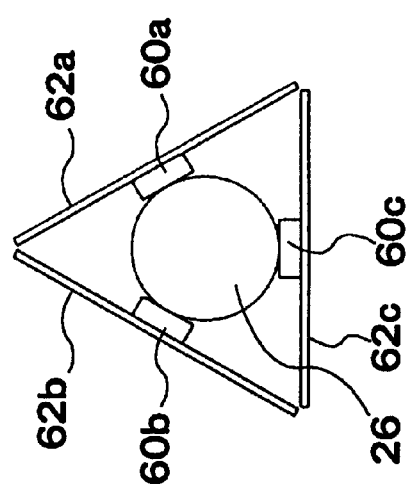
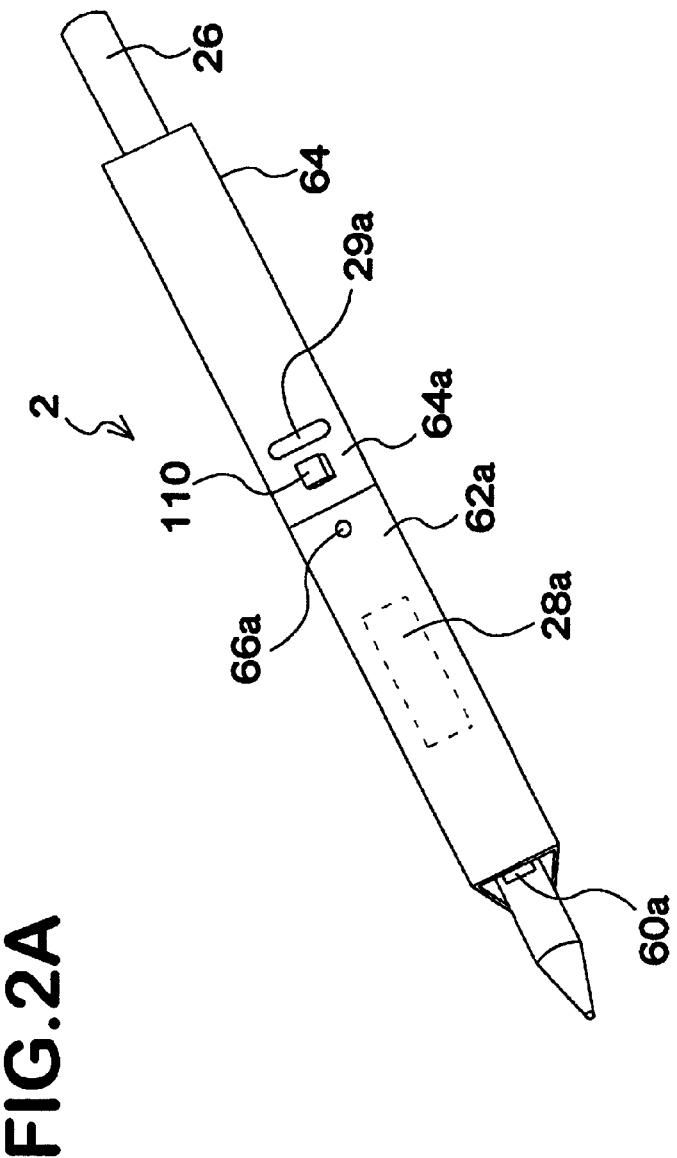

SWITCH ON

SWITCH OFF

29a:MERCURY SWITCH

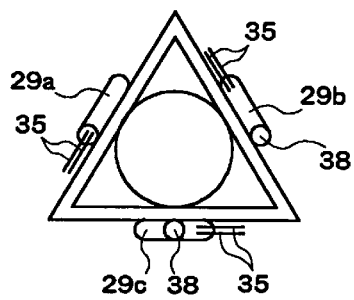
FIG.7A
HELD STATE A
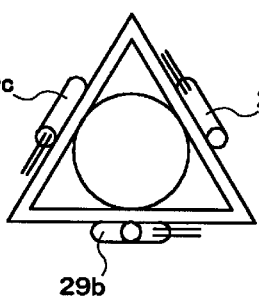
FIG.7B
HELD STATE B
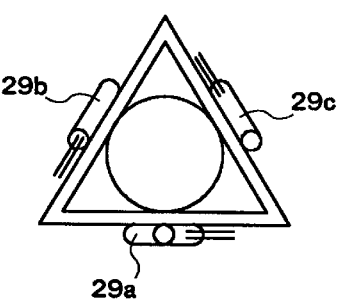
FIG.7C
HELD STATE C
FIG.8
|  | HELD STATE A | HELD STATE B | HELD STATE C |
|---|---|---|---|
| MERCURY SWITCH 29a | ON | OFF | — |
| MERCURY SWITCH 29b | OFF | — | ON |
| MERCURY SWITCH 29c | — | ON | OFF |

|  | HELD STATE A | HELD STATE B | HELD STATE C |
|---|---|---|---|
| STRAIN GAUGE 28a | INDEX FINGER | THUMB | MIDDLE FINGER |
| STRAIN GAUGE 28b | THUMB | MIDDLE FINGER | INDEX FINGER |
| STRAIN GAUGE 28c | MIDDLE FINGER | INDEX FINGER | THUMB |

PEN-GRIP TYPE OF INPUT APPARATUS AND INPUT APPARATUS

FIELD OF THE INVENTION

This invention relates to pointing device, particularly, a device which performs pointing utilizing finger pressure.

BACKGROUND ART

Personal computers and the like require means for moving a cursor on a CRT (cathode-ray tube) to a desired position where necessary data are input. Specifically, when using a software having graphic function, opening points and terminating points for shapes frequently have to be designated using such means. Also, when using a software having word processor function, the position where characters and the like are to be input and a desired choice is being displayed are designated using such means.

To perform this position designation, a mouse or arrow key of the keyboard is used. When using the mouse rather than the arrow key, the cursor can be moved as desired in an oblique direction as well as up-down and right-left. A click of a button attached on the mouse can easily input the data necessary to a selected designated position. That is, a pointing procedure using the mouse is more rapid than using the arrow key.

Also, in the use of the mouse a user can obtain a human sense of the procedure because the cursor moves in the same direction as the mouse is moved.

Thus, the mouse has been generally used as a pointing device for personal computers.

The above-mentioned conventional devices have the following problems.

The mouse requires space to operate it around the personal computer because the mouse needs to be able to be moved in any right-left and up-down direction on a plane. Usually such a space is provided on a corner of a table on which the personal computer is disposed, resulting in limitations in space available to arrange files and the like.

Also, because there is usually a limitation in space to operate in order to move the mouse to a distant place, not one move but several moves of the mouse is required. This results in a gap between the human operating sense and the move of mouse.

DISCLOSURE OF THE INVENTION

The object of the present invention is to provide an input pointing device capable of solving the problems described above, and obtaining the human operating sense without a large amount of space.

The input device according to the present invention is provided around a writing instrument, and comprises pressure detecting means for detecting pressures applied by the fingers of a writing worker, displaying means for receiving the outputs showing finger pressures from the pressure detecting means and thereby moving a cursor display on the screen. Therefore, the writing worker or a user of the pen-grip type input device can move the cursor to a desired position with only pressures applied by his fingers. Therefore, there is no limitation in space available to arrange files and the like. This results in effective operation within a space around the personal computer because there is no need to provide a specific space to operate the mouse in the space.

Also, the writing worker can increase the moving speed of the cursor by only increasing the applied finger pressures.

Therefore, the writing worker can obtain a human sense of the operations because the movement of the cursor corresponds to the applied finger pressure.

The input device according to the present invention also comprises a held state recognizing means for receiving outputs from gravity detecting means provided around the writing instrument and thereby recognizing the held state of the writing instrument. Therefore, it can recognize the held state of the writing instrument and the corresponding relationship between the pressure detecting means and fingers.

The input device according to the present invention comprises pressure detecting means having an elastic member and strain gauges provided with the elastic member. Therefore, it can detect correctly the finger pressures.

The input device according to the present invention is provided with a fixing signal generating means for generating and outputting a fixing position to fix the position of the cursor, and with outputting means for outputting data about the present cursor position to another device according to necessity, so that it can fix the position of the cursor and input data in the present cursor position.

BRIEF DESCRIPTION OF THE DRAWINGS

FIG. 2A is an oblique view of the pen-grip.

FIG. 2B is a view of the pen attached to the pen-grip as seen from the direction of the pen top.

FIGS. 7A, 7B and 7C are diagrams for describing the held state of the pen-grip and the on/off state of the mercury switch.

FIG. 8 is a table for describing the held state of the pen-grip and the on/off state of the mercury switch, with the held state A corresponding to the state of FIG. 7A, with the held state B corresponding to the state of FIG. 7B and with the held state C corresponding to the state of FIG. 7C.

PREFERRED EMBODIMENT OF THE INVENTION

A pen-grip type input device as an embodiment of the present invention will hereinafter be described with reference to the appended drawings.

Figure 1:
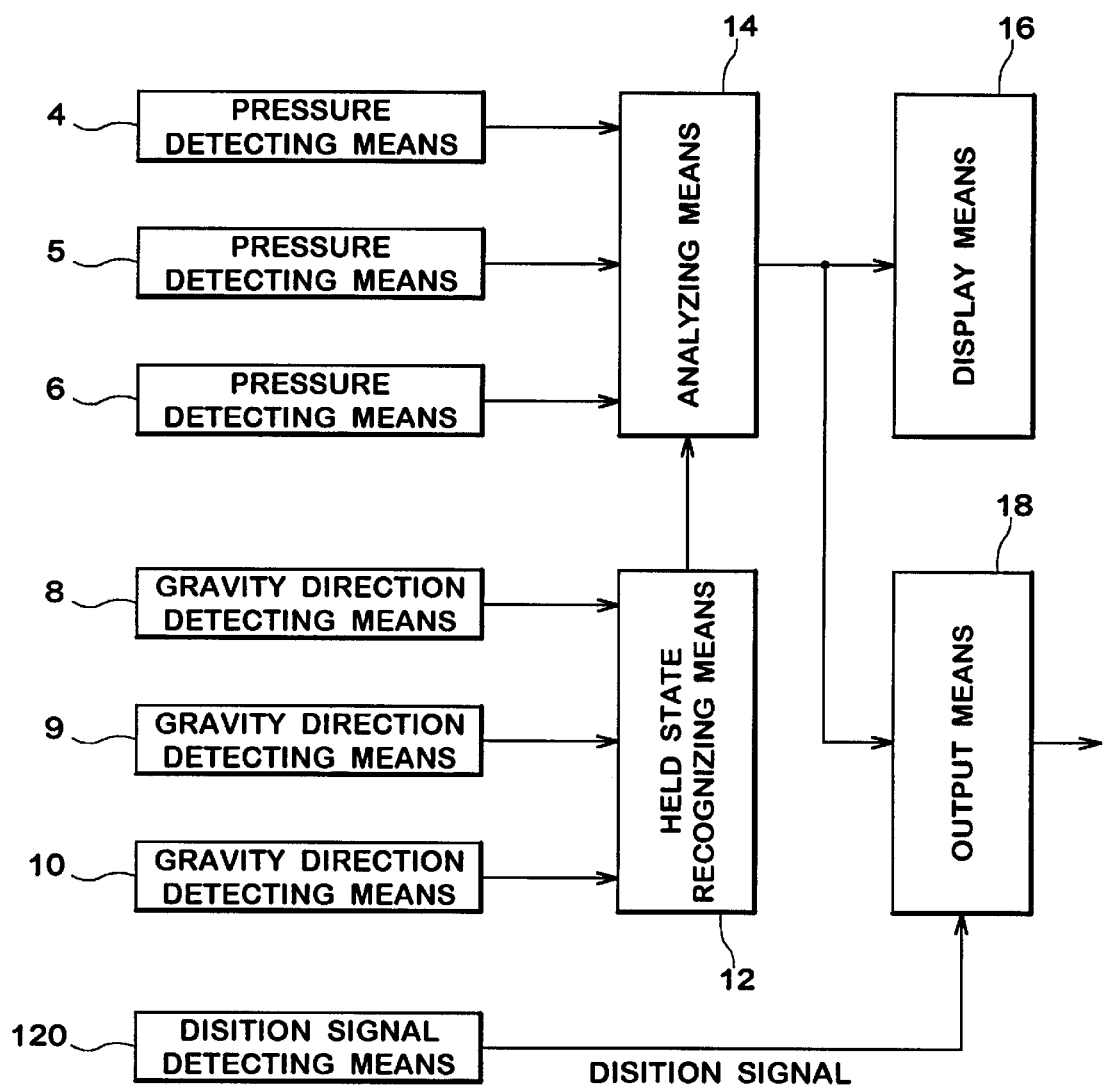
FIG. 1 is a block diagram of a configuration of a pen-grip type of input device as an embodiment of the present invention.

FIG. 1 is a block diagram of a configuration of a pen-grip type input device. On a pen is provided a pen-grip on which pressure detecting means 4,5 and 6, gravity detecting means 8,9 and 10 and fixing signal generating means 120 are attached. When the manner of holding the pen-grip is changed, the corresponding relationship between the pressure detecting means 4,5 and 6 and the fingers will change. Then, the corresponding relationship is determined with gravity direction means 8,9 and 10 and held state recognizing means 12. The gravity detecting means 8,9 and 10 are sensors for detecting the direction of gravity, which are mercury switches in this embodiment, and are provided on the same place on which the pressure detecting means 4,5 and 6 are disposed so as to be set to on or off depending on the tilt of the plane. The held state recognizing means 12 collectively determines the states of the gravity direction detecting means 8,9 and 10 and determines which of them corresponds to which finger.

Pressures measured with the pressure detecting means 4,5 and 6 are converted into electric signals and supplied as waveforms to analyzing means 14. The analyzing means 14 analyzes the supplied signals from the pressure detecting means 4,5 and 6 after consideration of an output from the held state recognizing means 12 and then measures the direction and distance of a cursor to be moved.

To displaying means 16 is given the order about direction and distance to be moved by the cursor which is measured by the analyzing means 14. The displaying means 16 has a screen capable of displaying the cursor and moves the cursor on the basis of the order about direction and distance.

The fixing signal generating means 120 outputs a fixing signal for fixing a position of a cursor. Specifically, when the cursor is displayed on the display means 16 in the desired position, a user of pen-grip type input device generates a fixing signal to fix the cursor at the desired position by operating the fixing signal generating means 120. When the fixing signal is output, the output means 18 reads data about the position of the fixed cursor and at the same time outputs this data to another device according to necessity.

A specific constitution of the pen-grip 2 will be described with reference to FIGS. 2A and 2B. The pen-grip 2 includes a support body 64 with a triangular column shape having three faces 64a, 64b and 64c. A writing instrument 26 such as a ball pen, a felt tipped pen, a pencil or a fountain pen is inserted into the interior of the support body 64. The support body 64 is provided with a recess in which are disposed mercury switches 29a, 29b and 29c directed generally at right angles to the axial direction of the writing instrument 26.

Figure 4A:
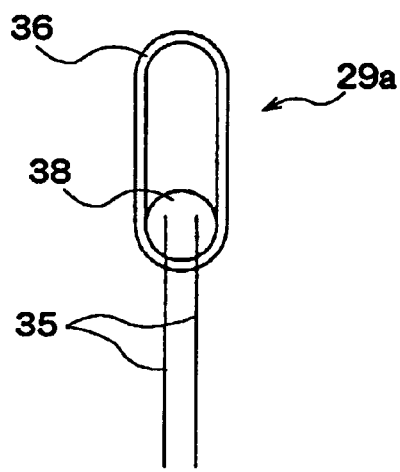
FIG. 4A is a view showing the on state of the mercury switch.
Figure 4B:
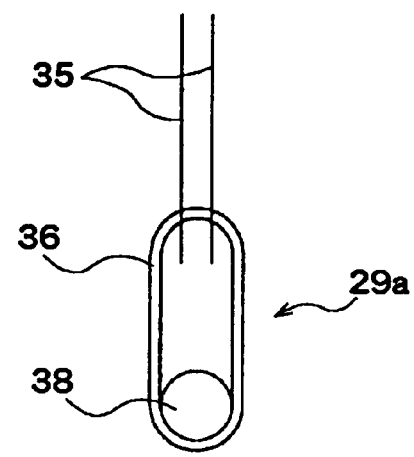
FIG. 4B is a view showing the off state of the mercury switch.

The mercury switches 29a, 29b and 29c are respectively mounted on the faces 64a, 64b and 64c. The mercury switch 29a, as shown in FIGS. 4A and 4B, comprises a glass container 36 with mercury enclosed in it and two leads attached to the container. Mercury 38 can move freely within the glass container 36. When the mercury switch 29a is in the state of FIG. 4A, the two leads are interconnected with mercury 38 so as to function as a switch. Other mercury switches 29b and 29c are of the same constitution.

As shown in FIG. 2A, on the face 64a of the support body 64 is provided a microswitch 110 which can function as the fixing signal generating means. Though, in this embodiment, the microswitch 110 is provided on only the face 64a, the other faces 64b and 64c may also be provided microswitches respectively so that the microswitch is easy to operate in spite of how the pen-grip is held.

Figure 3A:
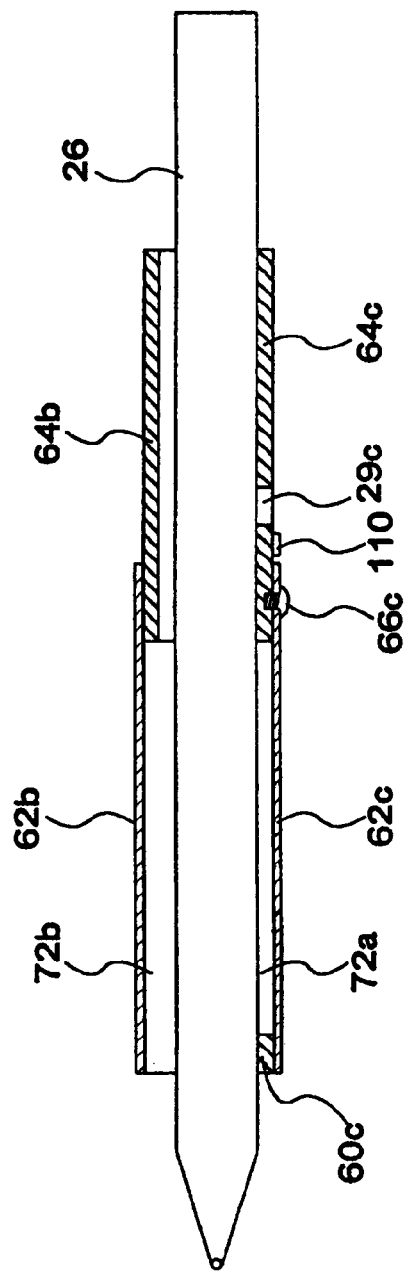
FIG. 3A is a cross-sectional view of the pen-grip of FIG. 2.

Also, the three faces 64a, 64b and 64c of the support body 64 are respectively provided with elastic members or plate springs 62a, 62b and 62c secured with screws 66a, 66b and 66c. At the ends of the plate springs 62a, 62b and 62c are provided contact members 60a, 60b and 60c of acrylic material of about the same thickness as that of the support body 64. As a result, as shown in FIG. 3A, spaces 72a, 72b and 72c are formed between the central portion of the plate springs 62a, 62b and 62c and the writing instrument 26.

Figure 3B:
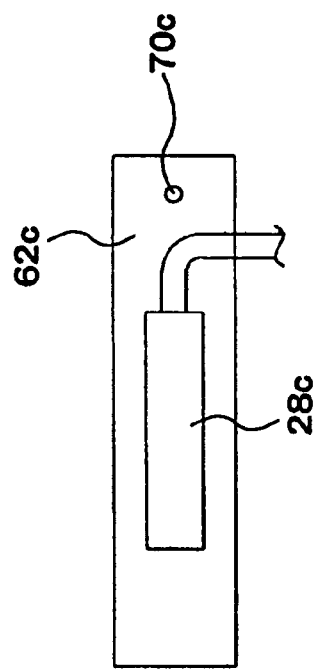
FIG. 3B is a view of a strain gauge 28c mounted on the back surface of a plate spring 62c.

As shown in FIG. 3B, on the back side of the plate spring 62c is bonded a pressure detecting means or a strain gauge 28c. The back sides of plate springs 62a and 62b are also provided with strain gauges 28a and 28b respectively in a similar manner. Therefore, outputs are obtained from the strain gauges 28a, 28b and 28c when the plate springs 62a, 62b and 62c deform according to the finger pressures.

Figure 5:
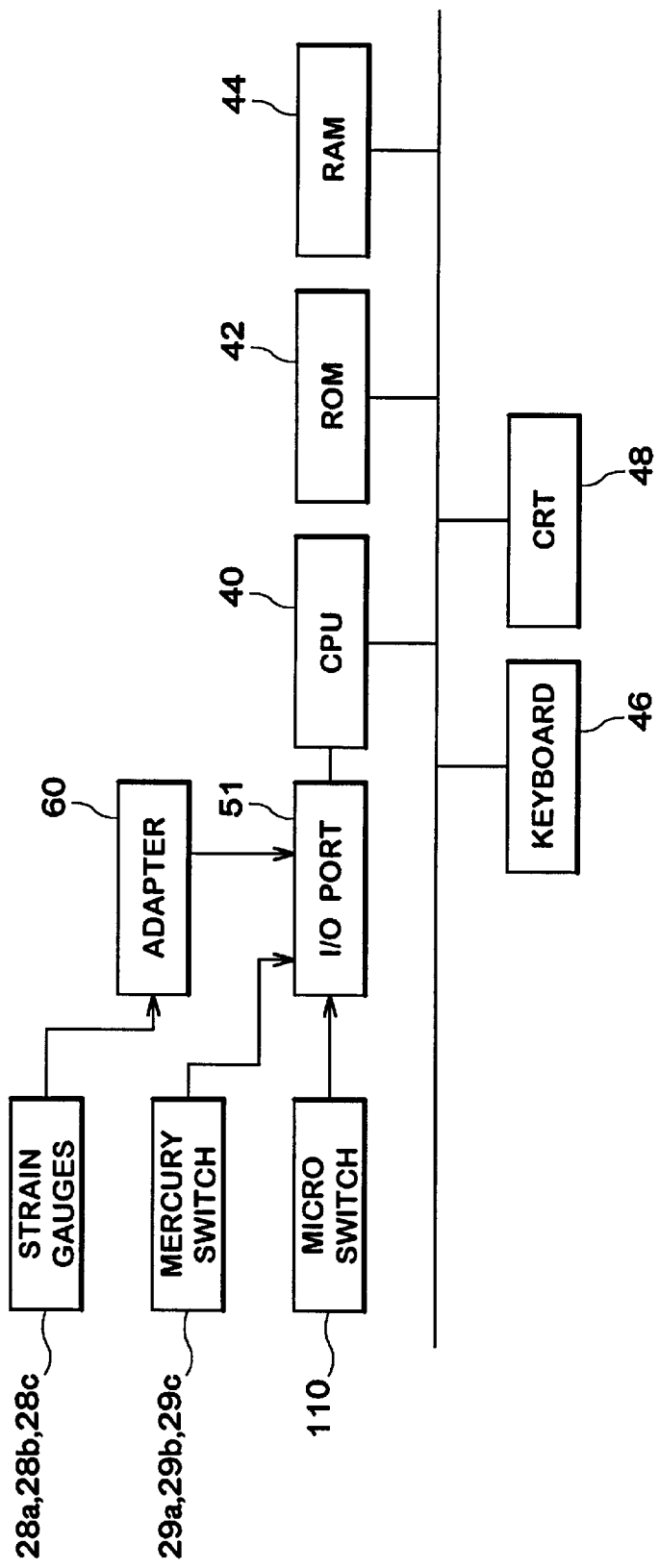
FIG. 5 shows a hardware constitution of the pen-grip type of input device as an embodiment of the present invention.

An example of the hardware in which the function of each block shown FIG. 1 is realized by use of a CPU is shown FIG. 5. To the CPU 40 which functions as the analyzing means are connected through an I/O port 51 an adapter 60, the strain gauges 28a, 28b and 28c, the mercury switches 29a, 29b and 29c, and the microswitch 110. Also, to the CPU 40 are connected through a busline a ROM 42, RAM 44, a keyboard 46 and a CRT 48. The CPU 40 controls each part according to programs stored in the ROM 42.

In the ROM 42 or the RAM 44 is stored a program or the like with which is specified the manner of measuring direction and distance to be moved by the cursor on the basis of finger pressures detected by the strain gauges 28a, 28b and 28c. The RAM 44 also stores outputs from the strain gauges 28a, 28b and 28c, and the like. The keyboard 46 is used for inputting commands when the commands are required for proceeding with the pointing work. A CRT 48 which functions as displaying means displays graphics (a cursor and the like) required for proceeding with the pointing work.

Figure 6:
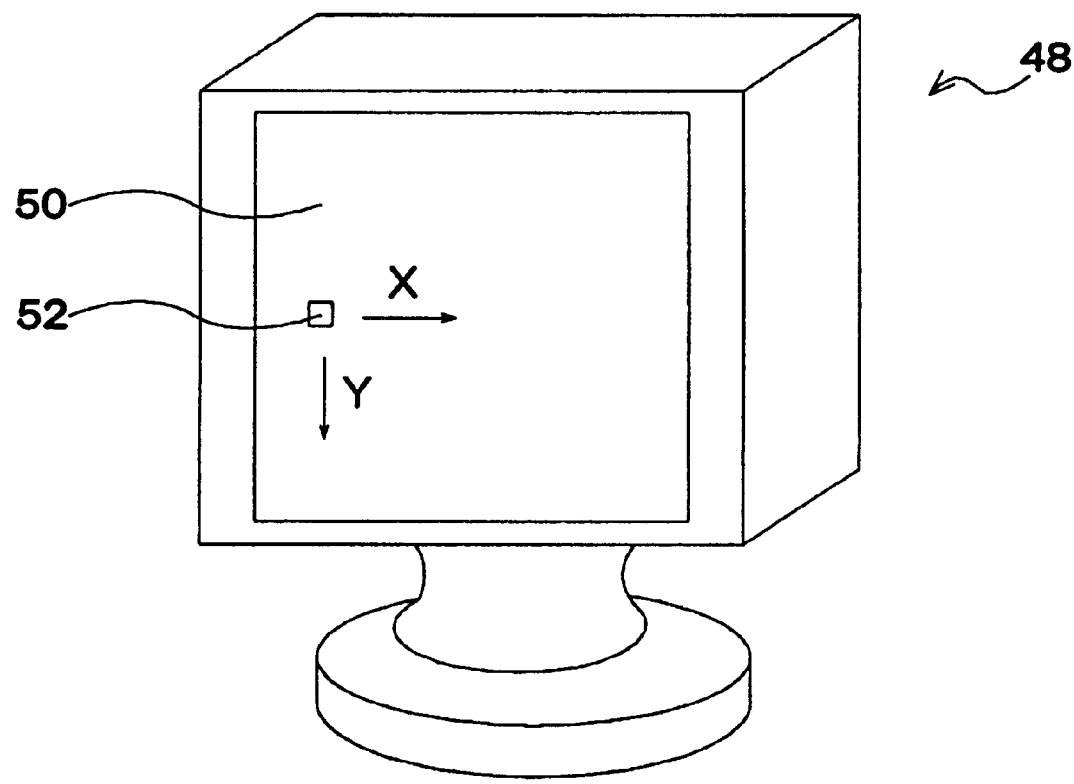
FIG. 6 is for describing a move of the cursor.

Next will be described a manner of pointing using the pen-grip input device. On a screen 50 of the CRT for a personal computer, as shown in FIG. 6, is displayed a cursor 52. The cursor 52 can move freely in up-down, right-left and oblique directions according to intensity of pressures applied to the strain gauges 28a, 28b and 28c.

An operator who performs the pointing work using the pen-grip input device ("inputting worker" hereinafter) mounts the pen-grip 2 on the writing instrument, holds the pen-grip 2 with the middle finger, index finger and thumb at natural pressure. Since in this state the pen-grip 2 is held at natural pressure (this state is called "held state" hereinafter) pressures applied on each of the strain gauges 28a, 28b and 28c is relatively small. At that time, there is no change in the position of the cursor 52 on the screen 50 of the CRT 48.

Here, the three fingers are made to come in contact with the three plate springs 62a, 62b and 62c respectively. The corresponding relationship between the finger and the plate springs 62a, 62b and 62c may be arbitrary. For example, it may be arranged that the middle finger comes in contact with the plate spring 62a, the index finger with the plate spring 62b, and the thumb with the plate spring 62c. Alternatively, it may be arranged that the middle finger comes in contact with the plate spring 62b, the index finger with the plate spring 62c, and the thumb with the plate spring 62a.

In the recognition process of the pen-grip type input device, first the corresponding relationship between the plate springs 62a, 62b and 62c, namely the strain gauges 28a, 28b and 28c, and the middle finger, index finger, and thumb is determined as follows.

The state in which the writing instrument with pen-grip is held in the palm is defined as the held state. The held state is classified into three; the held state A, held state B, and held state C shown in FIG. 7. In the held state A, the mercury switch 29a is on and the mercury switch 29b is off. The mercury switch 29c may be switched on or off depending on slight tilt of the pen-grip. When this case is represented with "–", the on and off states of the mercury switches 29a, 29b and 29c in the held states A, B and C are as shown in FIG. 8.

In order to determine in which of the held states A, B and C the pen-grip 2 in the writers hand is, the on and off state of the three mercury switches are determined according to the following rule. (1): The held state is A if the mercury switch 29a is on and the mercury switch 29b is off. (2): The held state is C if the mercury switch 29a is on, the mercury switch 29b is on, and the switch 29c is off. (3): The held state is B if the mercury switch 29a is off and the mercury switch 29c is on. (4): The held state is C if the switch 29c is off and the mercury switch 29b is on when the mercury switch 29a is off. Cases other than the above are regarded as not being in the normal written state.

Information on the on or off state of the mercury switches 29a, 29b and 29c is given as binary information to the CPU 40. The CPU 40 determines the held state of the pen-grip 2 according to the rule described above, and determines the corresponding relationship between the strain gauges 28a, 28b and 28c and the middle finger, index finger and thumb. The determined relationship is stored in the RAM 44.

The inputting worker, with the writing instrument provided with pen-grip 2 held in hand, intentionally applies a pressure to the pen-grip when he is drawing a line in a direction in which he desires to move the cursor. Meanwhile, the inputting worker need not in fact move the writing instrument and may arrange finger pressures of the three fingers as if he drew a line in the desired direction.

Specifically, when the inputting worker wants to move the cursor in the right direction (the direction of arrow X shown in FIG. 6), he applies greater strength to his thumb relatively, and when he wants to move the cursor in the left direction, the inputting worker applies greater strength to his index finger relatively. Also, when the inputting worker wants to move the cursor in the down direction (the direction of arrow Y), he applies relative greater strength to his thumb and index finger and relative smaller strength to the middle finger. When the inputting worker wants to move the cursor in the up direction the reverse of this performance is effected.

Since this state is a state wherein the inputting worker intentionally applies pressures to the strain gauges 28a, 28b and 28c (this state is called "pointing state" hereinafter) to perform the pointing work the strain gauges 28a, 28b and 28c receive strong pressures from his fingers. At that time, the cursor is moved according to the applied pressures of the three fingers.

Figures 9, 10:
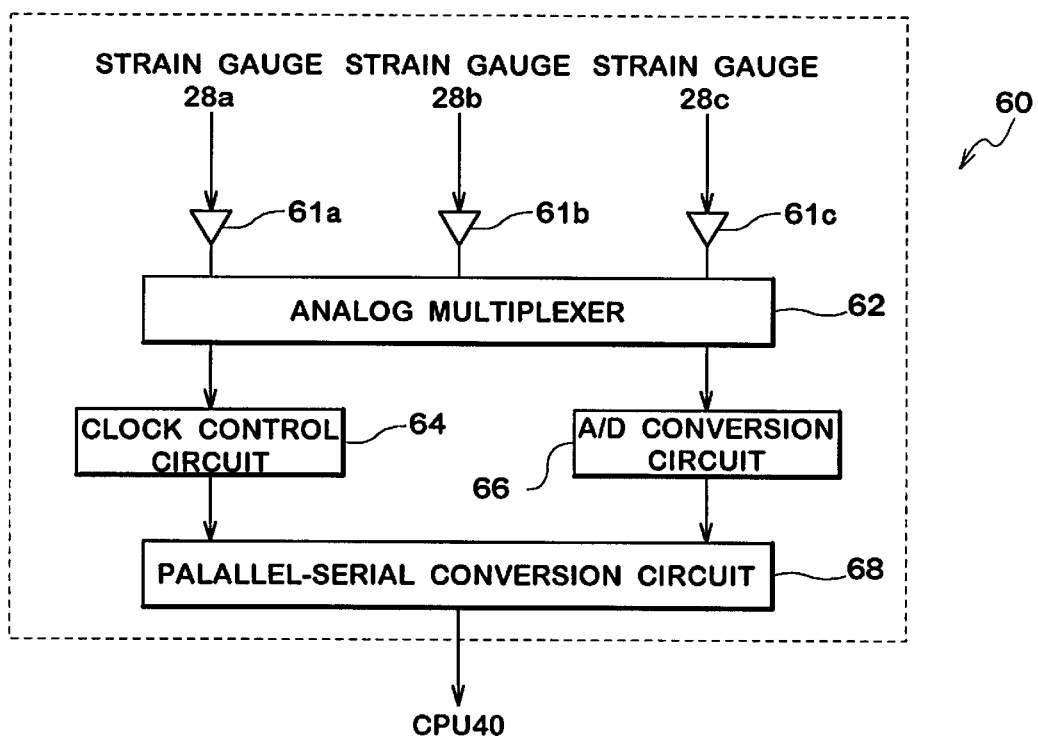
FIG. 9 is a table for describing the relationship between the strain gauges and the fingers, with the held state B corresponding to the state of FIG. 7B and with the held state C corresponding to the state of FIG. 7C.
FIG. 10 is a view showing the constitution of the adapter for converting the electric signals from the strain gauges into digital signals.

Finger pressures detected by the strain gauges are converted into voltage values in the following process. First, the strain gauges 28a, 28b and 28c detect finger pressures as an electric signal. The electric signals output by the strain gauges 28a, 28b and 28c are converted into digital signals by an adapter 60 of FIG. 10. The adapter 60 comprises amplifier 61a, 61b and 61c, analog-multiplexer 62, clock control circuit 64, A/D converting circuit 66, and parallel-serial converting circuit 68.

The amplifiers 61a, 61b and 61c perform analog processing such as offset and gain arrangement and the like, and convert the outputs from the strain gauges 28a, 28b and 28c into voltage potential. According to clock signals from a clock control circuit 64, the outputs from the strain gauges 28a, 28b and 28c are in order selected with the analog-multiplexer 62 and added to the A/D converting circuit 66 as voltage form.

The A/D converting circuit 66 holds the received voltage in a certain time according to the clock (sampling pulses) and outputs the received voltage in digital signal form. The parallel-serial converting circuit 68 converts the selected voltage value at that time from the strain gauges 28a, 28b and 28c into serial data and outputs them to the CPU 40. The CPU 40 stores the received data though the I/O port 51 in each part of the RAM corresponding to the strain gauges 28a, 28b and 28c.

Figure 11:
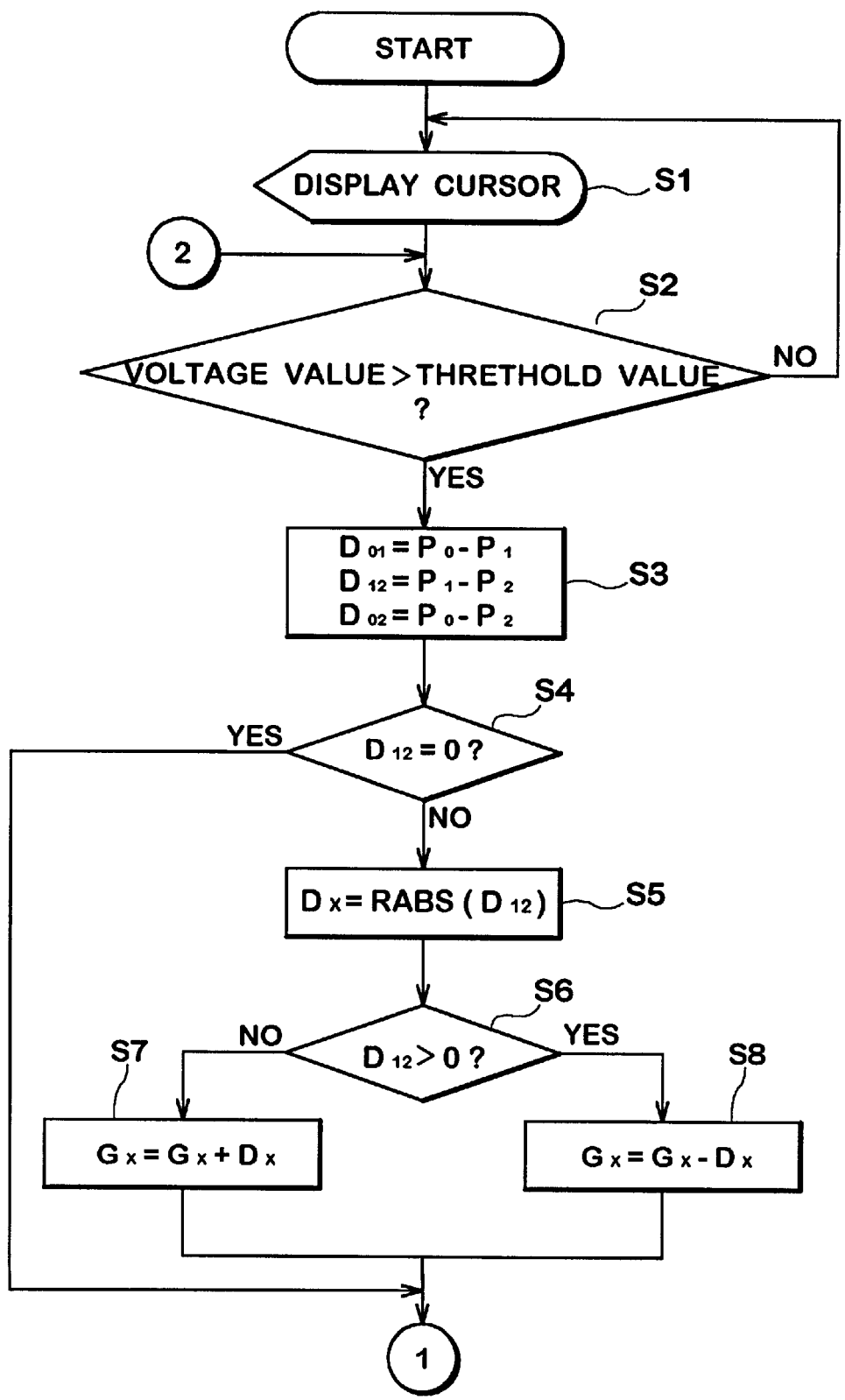
FIG. 11 is a flow chart for describing a process of giving direction and distance to be moved of the cursor using pen-grip input device.
Figure 12:
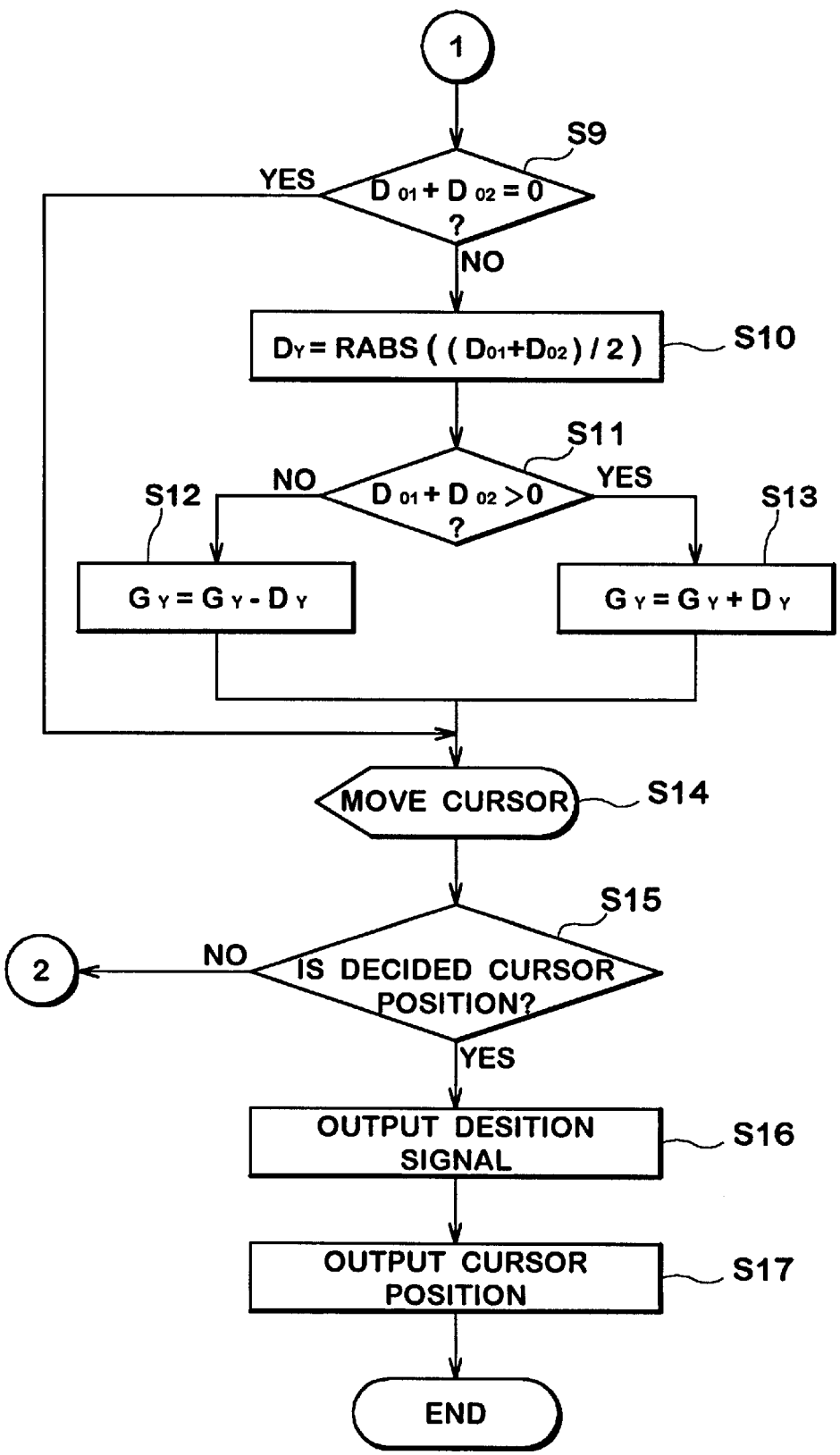
FIG. 12 is a flow chart for describing a process of giving direction and distance to be moved of the cursor using pen-grip input device.

The manner of analyzing using the CPU 40 will be described with reference to FIG. 11 and FIG. 12. FIG. 11 and FIG. 12 are a series of flow charts showing procedure for measuring direction and distance for the cursor to be moved. The mark →① of FIG. 12 follows the mark →① of FIG. 11 and the mark →② of FIG. 11 follows the mark →② of FIG. 12. Note that here, in outputs from the mercury switches 29a, 29b and 29c, the strain gauge 28a corresponds to the middle finger, the strain gauge 29b to the index finger and the strain gauge 28c to the thumb.

For example, in the first step the cursor is disposed and displayed at center of screen (STEP S1). Note that the position of the cursor in the screen is shown using coordinates (Gx, Gy), and "(0,0)" represents a left and top corner and "639,399" represents a right and bottom corner. Each figure in parentheses corresponds to the number of dots of the screen 50. A move from (0,0) to (1,1) means the cursor is moved one dot right and one dot down.

The CPU 40 reads the output (voltage value) from the strain gauges 28a, 28b stored in the RAM 44 and then judges to distinguish between the held state and the pointing state with read data.

This distinction is effected by comparing the given voltage value with the predetermined threshold voltage value (STEP S2). When the given voltage value is more than the threshold voltage value the CPU 40 judges that the given voltage value represents the pointing state. While, when the given voltage value is less than the threshold voltage value the CPU 40 judges that the given voltage value represents the held state.

In this embodiment, the threshold voltage is designated to be 1.2 volts. When all voltages of the strain gauges 28a, 28b and 28c are less than 1.2 volts the CPU judges that the pen-grip is in the held state. The pointing state corresponds to a range of voltage values from 1.2 volts to 6.0 volts.

Note that when a voltage value from one of the strain gauges is more than the threshold voltage value, the CPU judges that the pen-grip is in the pointing state even when a voltage value from the other of the strain gauges is less than the threshold voltage value.

In the analysis, the following processing is applied to the voltage showing the pointing state. A move of the cursor 52 divides into a move portion in the right-left direction and a move portion in the up-down direction. Therefore, a move in oblique direction is represented with a combination of a move portion in the right-left direction and a move portion in the up-down direction. Thus, first a move portion in the right-left direction and a move portion in the up-down direction are analyzed.

Here, it is assumed that the pressures applied to the strain gauges 28a, 28b and 28c are voltage values P0, P1 and P2 respectively. That is, the voltage value P0 is the pressure of middle finger, the voltage value P1 is the pressure of index finger and the voltage value P2 is the voltage value of thumb. Also, when it is provided that the pressure differential between the middle finger and the index finger is a voltage value D01, the pressure differential between the index finger and the thumb, a voltage value D12 and the pressure differential between the middle finger and the thumb a voltage value D02, the voltages D01, D12 and D02 is given by the following formula (STEP S3):

D01=P0−P1

D12=P1−P2

D02=P0−P2

A manner of analyzing a move in the right-left direction will be described below. The move in the right-left direction is effected by relative relation between a pressure P1 of index finger and a pressure P2 of thumb.

The voltage value D12 is a value given by subtracting the pressure (voltage value) of thumb from the pressure (voltage value) of index finger. When this value is positive (D12>0), then the CPU judges that it has received an order signal to move the present cursor 52 in the left direction because the pressure of index finger, which is relatively larger than that of thumb, is being applied. When this value is negative (D12<0), then the CPU judges that it has received an order signal to move the present cursor 52 in the right direction because the pressure of thumb, which is relatively larger than that of index finger is being applied. Also, when this value is zero (D12=0), then the CPU judges that it has received an order signal not to move the cursor 52 in a right-left direction because the pressure of thumb is equal with the pressure of index finger (STEP S4).

Next, the distance to be moved in the right-left direction is given by the following steps. It is provided that a value RABS(D12) is an integral given by rounding off the fractions of absolute value of the value D12 to one decimal place. Assuming that the pressure P1 is 2.8 volts and the pressure P2, 3.6 volts, the voltage value D12 is −0.8 volts (minus zero point eight voltage). The absolute of this value D12 (−0.8 volts) is 0.8. The value RABS(D12) given by rounding off the fraction of absolute value (0.8) to one decimal place is 1.

When this distance to be moved of cursor 52 is changed into the number of dots to be moved, the value RABS(D12) represents the dot number to be moved in the right-left direction of the cursor. Since in the above instance the value RABS(D12) is 1 when the voltage value D12 is −0.8, the dot number means one. Also, since the voltage value D12 is negative (D12<0), the cursor is moved one dot in the right direction (STEP S5).

The dot number to be moved in the right direction is added or subtracted to the present value of the X-coordinate at that time. If the order signal is to move the cursor in the right direction the addition is performed (STEP S7) and if the order signal is to move the cursor in the left direction the subtraction is performed (STEP S8).

Next, there will be described a manner of giving the distance to be moved in the up-down direction. The move in the up-down direction is effected by relative relation between a pressure P0 of middle finger and a pressure P1 or a pressure P2 of thumb.

The voltage value D01 is a value given by subtracting the pressure (voltage value) of index finger from the pressure (voltage value) of middle finger. The voltage value D02 is a value given by subtracting the pressure (voltage value) of thumb from the pressure (voltage value) of middle finger.

When the sum of the value D01 and the value D02 is positive (D01+D02>0), then the CPU judges that it has received an order signal to move the present cursor 52 in the up direction. When the sum of the value D01 and the value D02 is negative (D01+D02<0), then the CPU judges that it has received an order signal to move the present cursor 52 in the down direction.

When the sum of the value D01 and the value D02 is zero (D01+D02=0), then the CPU judges that it has received an order signal not to move the cursor 52 in the up-down direction (STEP S9).

Next, the distance to be moved in the up-down direction is given by the following steps. It is provided that a value RABS(D01+D02/2) is an integral given by obtaining the mean (D01+D02/2) between the voltage value D01 and the voltage value D02 and rounding off the fractions of absolute value of the mean to one decimal place. Assuming that the pressure P0 is 1.3 volts, the pressure P1 is 2.8 volts and the pressure P3 is 3.6 volts, since the voltage D01 is −1.5 volts and the voltage value D02 is −2.3 volts the mean (D01+D02/2) between them is −1.9 volts because {−1+(−2.3)}/2=−1.9. Since the absolute value of the mean is 1.9 volts the value RABS(D01+D02/2) given by rounding off the fraction of absolute value (1.9) to one decimal place is 2.

This value RABS(D01+D02/2) corresponds to the number of dots to be moved in the right-left direction of the cursor. Therefore, since the value RABS(D01+D02/2) is 2 the number of dots to be moved is also 2. Also, since in this instance the voltage value RABS(D01+D02/2) is negative (D01+D02/2<0), the cursor 52 is moved two dots in the down direction (STEP S10).

The dot number RABS(D01+D02/2) to be moved in the down direction is added or subtracted to the present value of the Y-coordinate at that time. If the order signal is to move the cursor in the up direction the dot number RABS(D01+D02/2) is subtracted from it (STEP S12) and if the order signal is to move the cursor in the left direction the dot number RABS(D01+D02/2) is added to it (STEP S13).

There will be hereinafter described a manner of obtaining distance to be moved in an oblique direction. A move in an oblique direction is effected by combining a move in the right-left direction and a move in the up-down direction. It is assumed that the pressure P0 is 1.3, the pressure P1 is 2.8 and the pressure P2 is 3.6. In this assumption, since direction and distance in the right-left move is determined by the sign (+,−,O) of the voltage value D12 and the value RABS(D12) the right-left move is to move one dot in right direction. And, since direction and distance in the up-down move is determined by the sign (+,−,O) of the voltage value D01+D02 and the value RABS(D01+D02/2), the up-down move is to move two dots in the down direction.

The move in an oblique direction is a move given by combining them. Therefore, the cursor 52 is moved one dot in the right direction and two dots in the down direction. That is, the cursor 52 is moved in a right and down direction. Its distance to be moved is the square root of (the dot number in X-coordinate)2+(the dot number in Y-coordinate)2 as a crow flies. The above-described operations are performed at a speed according to the processing capacity of CPU 40 and the like. In this embodiment, these operations are performed at the rate of fifty per second. Therefore, a position of the cursor 52 is also determined at the rate of fifty per second. According to the determinations, the cursor 52 is moved on the screen 50 (STEP S14). While the strain gauges 28a, 28b and 28c are applied with the pressures the above-described operations and corresponding move of the cursor 52 is continued. When the cursor gets to the desired position, the pressures applied to the strain gauges 28a, 28b and 28c are reduced to the held state.

Next, there will be described a manner of fixing a desired position to which the cursor 52 has gotten. The cursor position is fixed using the microswitch 110 having a function of assuring inputs.

The input assuring function can fix a position of cursor displayed at the present time on the screen 50 of the CRT 48. The microswitch is pushed with the index finger of a pointing worker. This procedure results in the microswitch changing to the on state and outputs the fixing signal (STEP S16). This fixing signal is given to the CPU 40 via I/O port 51. The CPU 40 receives it and then fixes the position of cursor. The CPU 40 outputs data about the cursor position to other devices and software when there is a need to.

In the case of fixing the cursor position, the above fixing signal is satisfactorily operable. There may be, however, cases where other kinds of signals are necessary for other purposes. Specifically, in well-known software there may be cases where double clicks are necessary to designate a desired choice from the choices. Note that "double clicks" is to push a switch two times in an instance to designate a desired choice from the choices. Such a function is hereinafter called "double click function". The microswitch is provided with such a function. That is, when the microswitch 110 is pushed with the index finger two times in an instance and thereby the CPU 40 detects the two fixing signals (ON signals), a double click function is performed.

Figures 13A, 13B:
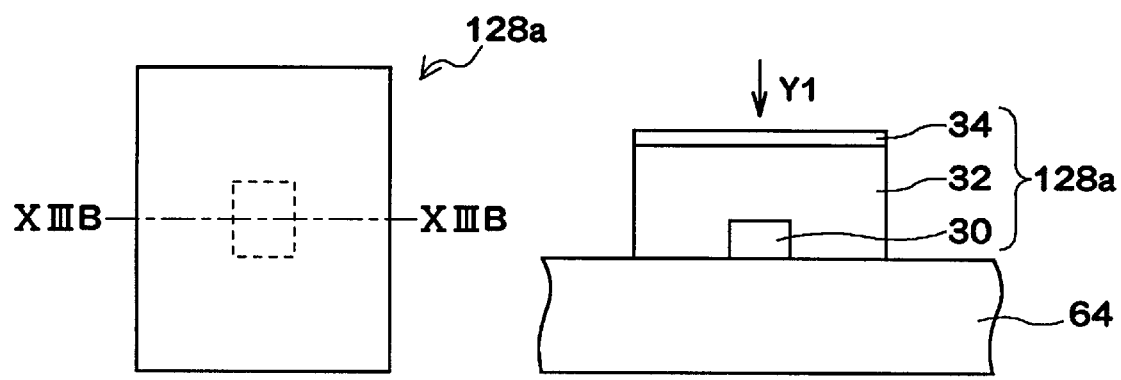
FIGS. 13A and 13B are views showing one embodiment of a pressure detecting means as another embodiment of the present invention.

While the strain gauges 28a, 28b and 28c are used as pressure detecting means for detecting the finger pressures in the above embodiment, a magnetic sensor 128a as shown in FIGS. 13A and 13B may be used. This magnetic sensor 128a has a magnetic resistance element 30 which is covered with a silicon rubber 32 and a magnetic sheet 34. When the finger pressure is applied to it in direction of Y1, according to the strength of finger pressure, the resistance value of the magnetic resistance element changes.

Also, in the alternative embodiment, piezoelectric ceramic pressure sensors, pressure conductive rubber, sensors utilizing capacitance or electromagnetic induction such as condenser microphone may be used. Furthermore, different sensors may be used from finger to finger.

While three strain gauges 28a, 28b and 28c are mounted on the pen-grip in the above embodiment, the number of the strain gauges may be four or more. The mounting position of the strain gauges 28a, 28b and 28c are not limited to those in the above embodiment.

Furthermore, while the pen-grip 2 is attached to the writing instrument in the above embodiment, the pen-grip 2 may be integral with the writing instrument.

Also, while the double click function is performed using only the microswitch 110, this function may be effected by simultaneous procedure of the microswitch 110 and any of the strain gauges 28a, 28b, 28c. For instance, the double click function may be effected by outputting in 0.5 seconds a voltage of five and the more volts from the strain gauge 28c corresponding to the thumb as a worker is pushing the microswitch 110 with the index finger so as to send the ON signal to the CPU 40.

Also, while the held state of the pen-grip 2 is recognized by detecting the direction of gravity by means of the mercury switches 29a, 29b, 29c in the above embodiment, the held state of the pen-grip 2 may be recognized by other means or other sensors.

While the three mercury switches 29a, 29b, 29c are provided in the above embodiment, the number of mercury switches may be four or more.

Also, while the microswitch is used as a fixing signal outputting means in the above embodiment, other switches such as pressure switches may be used.

Furthermore in the embodiment, the corresponding relationship between the strain gauges 28a, 28b, 28c and the fingers is established with the outputs from the mercury switches 29a, 29b, 29c. However, the corresponding relationship between the strain gauges 28a, 28b, 28c and the fingers may be present, for instance, with the strain gauge 28a corresponding to the middle finger, the strain gauge 28b to the index finger, and the strain gauge 28c to the thumb, so that the writer holds the writing instrument according to the corresponding relationship. Thus, the mercury switches 29a, 29b, 29c maybe omitted.

What is claimed is:

1. An input device moving a cursor being displayed on a screen, comprising:

a supporter provided around a writing instrument having an axis;

pressure measuring means for detecting a change in pressure applied by each of at least three fingers of a writing worker, said pressure measuring means provided around said supporter and having sensor elements corresponding to the at least three fingers, said each sensor element measuring finger pressures in a direction substantially perpendicular to the axis of the longitudinal writing instrument;

at least three gravity detecting means for detecting gravity direction, said gravity detecting means being provided around the writing instrument;

recognizing means for recognizing held status of the writing instrument on the basis of the output from the gravity detecting means; and analyzing means for determining which output of said pressure detecting means corresponds to which finger of the writing worker on the basis of the output from the gravity detecting means, obtaining output showing the pressure change outputted by said pressure measuring means, calculating therefrom direction and distance to be moved of a cursor in the light of output value of each finger and then outputting the calculated data.

2. An input device in accordance with claim 1, wherein the changes in pressure detected by the pressure measuring means are pressure changes applied by a middle finger, an index finger and a thumb of the writer.

3. An input device in accordance with claim 1, wherein said pressure measuring means comprises;

an elastic member; and strain gages coupled with elastic member.

4. An input device in accordance with claim 1 further including;

fixing signal generating means for generating a fixing signal, and output means for obtaining the fixing signal and thereafter outputting data regarding cursor position.

5. An input device in accordance with claim 1, wherein when the output from each of the sensor elements is less than a threshold value, there is no change in position of the cursor.

6. An input device for moving a cursor being displayed on a screen, comprising:

a pen having an axis;

pressure measuring means for detecting a change in pressure applied by each of at least three fingers of a writing worker, said pressure measuring means provided around said pen and having sensor elements corresponding to the at least three fingers, said each sensor element measuring finger pressures in a direction substantially perpendicular to the axis of the longitudinal pen;

at least three gravity detecting means for detecting gravity direction, said gravity detecting means being provided around said pen;

recognizing means for recognizing held status of said pen on the basis of the output from the gravity detecting means; and analyzing means for determining which output of said pressure detecting means corresponds to which finger of the writing worker on the basis of the output from the gravity detecting means, obtaining output showing the pressure change outputted by said pressure measuring means, calculating therefrom direction and distance to be moved of a cursor in the light of output value of each finger and then outputting the calculated data.

7. An input device in accordance with claim 6, wherein the changes in pressure detected by the pressure measuring means are pressure changes applied by a middle finger, an index finger and a thumb of the writer.

8. An input device in accordance with claim 6, wherein said pressure measuring means comprises;

an elastic member; and strain gages coupled with the elastic member.

9. An input device in accordance with claim 6 further including;

fixing signal generating means for generating a fixing signal, and output means for obtaining the fixing signal and thereafter outputting data regarding cursor position.

10. An input device in accordance with claim 6, wherein when the output from each of the sensor elements is less than a threshold value, there is no change in position of the cursor.

* * * * *